US007819581B2

(12) United States Patent
Srinivasan et al.

(10) Patent No.: US 7,819,581 B2
(45) Date of Patent: Oct. 26, 2010

(54) METHOD OF AND SYSTEM FOR CALIBRATION OF INSPECTION SYSTEMS PRODUCING X-RAY IMAGES

(75) Inventors: Govindarajan T. Srinivasan, Portsmouth, NH (US); Peter A. Reichert, Boston, MA (US); Michael W. Hamblin, Stow, MA (US); Joseph F. Wrinn, Winchester, MA (US); Dennis R. LaFosse, Littleton, MA (US)

(73) Assignee: Teradyne, Inc., North Reading, MA (US)

( * ) Notice: Subject to any disclaimer, the term of this patent is extended or adjusted under 35 U.S.C. 154(b) by 60 days.

(21) Appl. No.: 12/193,321

(22) Filed: Aug. 18, 2008

(65) Prior Publication Data

US 2009/0218480 A1    Sep. 3, 2009

Related U.S. Application Data

(60) Provisional application No. 61/036,636, filed on Mar. 14, 2008, provisional application No. 61/032,906, filed on Feb. 29, 2008.

(51) Int. Cl.
*G01D 18/00*    (2006.01)
*G01N 23/04*    (2006.01)

(52) U.S. Cl. ............................ 378/207; 378/19; 378/62; 378/98.8; 378/98.12

(58) Field of Classification Search .................. 378/19, 378/21, 62, 98.8, 98.12, 207
See application file for complete search history.

(56) References Cited

U.S. PATENT DOCUMENTS

| | | | |
|---|---|---|---|
| 6,748,046 B2 | 6/2004 | Thayer | |
| 7,330,535 B2 * | 2/2008 | Arenson et al. | 378/158 |
| 7,476,026 B2 * | 1/2009 | Braunstein | 378/207 |

OTHER PUBLICATIONS

U.S. Appl. No. 12/193,235, filed Aug. 18, 2008, Reichert et al.
Doi et al., "Real-time X-ray Inspection of 3-D Defects in Circuit Board Patterns," IEEE Proceedings of the Fifth International Conference on Computer Vision, 1995, pp. 575-582.

* cited by examiner

*Primary Examiner*—Edward J Glick
*Assistant Examiner*—Thomas R Artman
(74) *Attorney, Agent, or Firm*—Wolf, Greenfield & Sacks, P.C.

(57) ABSTRACT

According to one embodiment, a calibration system for calibrating image data produced by an imaging system is provided. The calibration system includes a processor configured for: receiving the image data from the imaging system; receiving a plurality of reference values from the imaging system; and calibrating the image data using the reference values. The reference values correspond to air image data produced by the imaging system.

20 Claims, 6 Drawing Sheets

METHOD OF AND SYSTEM FOR CALIBRATION OF INSPECTION SYSTEMS PRODUCING X-RAY IMAGES

CROSS-REFERENCE TO RELATED PATENT APPLICATIONS

This application claims priority to U.S. Provisional Patent Application No. 61/032,906, filed on Feb. 29, 2008, and U.S. Provisional Patent Application No. 61/036,636, filed on Mar. 14, 2008, the contents of all of which are incorporated herein by reference in their entirety.

BACKGROUND OF THE INVENTION

Embodiments of the present invention relate generally to calibration of systems for inspecting electronic assemblies such as, but not limited to, circuit cards and printed circuit boards (PCBs).

An X-ray system may be used to inspect such assemblies. For example, a PCB on which a ball grid array (BGA) is present may be inspected for defects. Such defects may include portions of the BGA where solder did not reflow properly during manufacturing and/or where the solder reflow process was similarly deficient or otherwise insufficient. As a result, defects such as bridges and ball-and-socket-type opens may be present.

One metric used to measure performance of an inspection system or process is the so-called "false calls" rate. This metric reflects the number of times an acceptable (or non-defective) joint of an assembly is incorrectly or unnecessarily identified as being unacceptable (or defective) during inspection. For example, in one scenario, an acceptable joint is incorrectly identified as being unacceptable by one system. However, the same joint is correctly identified as being acceptable by another system. The incorrect identification by the first system is an example of an occurrence that would result in an increase of the false calls rate. Ideally, the first system should have identified the acceptable joint as being acceptable, thereby preempting an increase of the false calls rate. To improve efficiency, the accuracy of inspection systems should be improved such that the false calls rate is decreased.

Calibration of inspection systems, such as the system described above, may be performed to provide various features. For example, as described above, such systems may be calibrated to improve stability and/or consistency across results provided by different systems. In addition, calibration may be used to improve stability, reproducibility and/or consistency across results provided at different times by a same system (for example, inspections performed over the operational lifetime(s) of one or more parts or portions of the system). Furthermore, calibration may be performed such that adverse effects of so-called "systematic errors" (i.e., repeatable errors that can be removed through calibration) are effectively removed or dampened. Such systematic errors may be caused, for example, by geometrical deficiencies, defects (or other imperfections) in system design, performance characteristics of system parts (e.g., the X-ray source and/or detection sensors), and other non-ideal operating conditions. Those skilled in the art will appreciate that the performance of an X-ray system may be negatively affected by both systematic errors and random noise.

SUMMARY OF THE INVENTION

An aspect of embodiments of the present invention is directed to minimizing (or reducing) the effects of systematic errors on the stability, reproducibility and consistency of imaging devices (or systems) such as, but not limited to, inspection devices. The inspection devices may use X-ray energy to generate the images.

According to one embodiment, a calibration system for calibrating image data produced by an imaging system is provided. The calibration system includes a processor configured for: receiving the image data from the imaging system; receiving a plurality of reference values from the imaging system; and calibrating the image data using the reference values. The reference values correspond to air image data produced by the imaging system.

According to another embodiment, a calibration system for calibrating image data produced by an imaging system is provided. The calibration system includes means for receiving the image data from the imaging system; means for receiving a plurality of reference values from the imaging system; and means for calibrating the image data using the reference values. The reference values correspond to air image data produced by the imaging system.

According to another embodiment, a method for calibrating image data produced by an imaging device is provided. The method includes: receiving the image data from the imaging device; receiving a plurality of reference values from the imaging device; and calibrating the image data using the reference values. The reference values correspond to air image data produced by the imaging device.

DETAILED DESCRIPTION OF THE PREFERRED EMBODIMENTS

Embodiments of the present invention are directed to calibration of systems for inspecting electronic assemblies such as, but not limited to, circuit cards and printed circuit boards (PCBs). In particular embodiments, the systems may be used to inspect PCBs on which ball grid arrays (BGAs) are present. In particular embodiments, the system is an X-ray inspection system, for example, operated according to a tomosynthesis imaging technique. Such a technique is disclosed in U.S. Pat. No. 6,748,046 to Thayer, the content of which is incorporated herein by reference in its entirety.

Although certain embodiments are described herein with reference to inspection systems using X-ray energy, other embodiments may be applied in other contexts including, but not limited to, inspection, imaging, and/or test systems employing X-rays or other suitable forms of electromagnetic energy.

Figure 1:
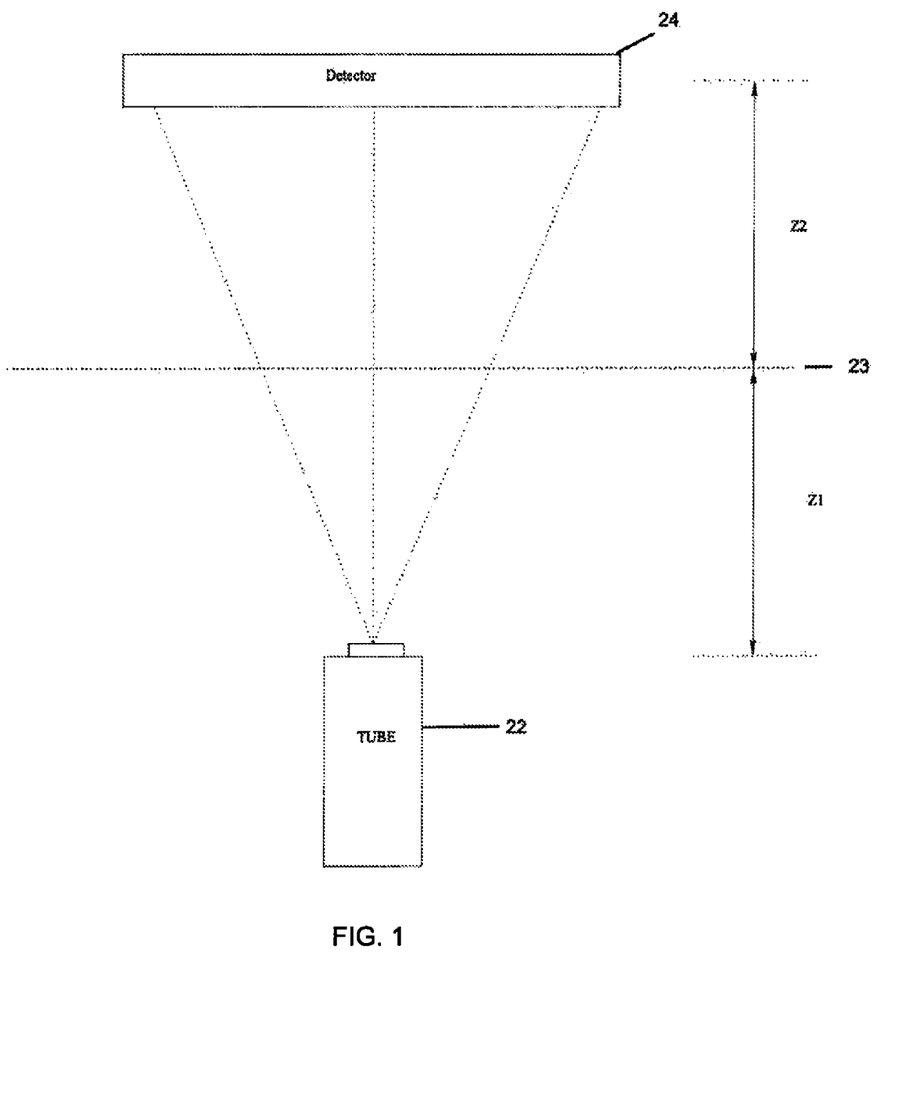
FIG. 1 shows an inspection system according to one embodiment.

With reference to FIG. 1, an X-ray inspection system according to one embodiment is shown. The system includes an X-ray source 22 (such as, but not limited to, an X-ray tube) positioned opposite an X-ray detector 24. In one embodiment, the detector 24 is a detection panel including a plurality of pixels. The detection panel may be generally flat. In a particular embodiment, the detector 24 is composed of 2496× 2304 generally square-shaped pixels, each pixel having a length of approximately 50 µm.

An object that is to be inspected (or imaged) (see, for example, object 231 of FIG. 2 and object 26, 46 of FIGS. 3A, 3B) is positioned at a reconstruction plane (or image plane) 23 located between the source 22 and the detector 24. With continued reference to FIG. 1, the reconstruction plane 23 is spaced at a distance Z1 from the focal spot of the source 22 and at a distance Z2 from the detector 24. The distances Z1, Z2 can be adjusted to suitably provide a desired field of view (FOV) of the object. During inspection, a voltage (such as, but not limited to, a voltage of approximately 110 kilovolts) and a current (such as, but not limited to, a current ranging from approximately 0.070 milliamps to approximately 0.140 milliamps) are applied to the source 22 for producing X-ray energy. Accordingly, the source 22 produces X-ray energy, which penetrates or is absorbed by the object 231, and penetrating X-ray energy is detected by one or more region(s) of the detector 24.

Figure 3A:
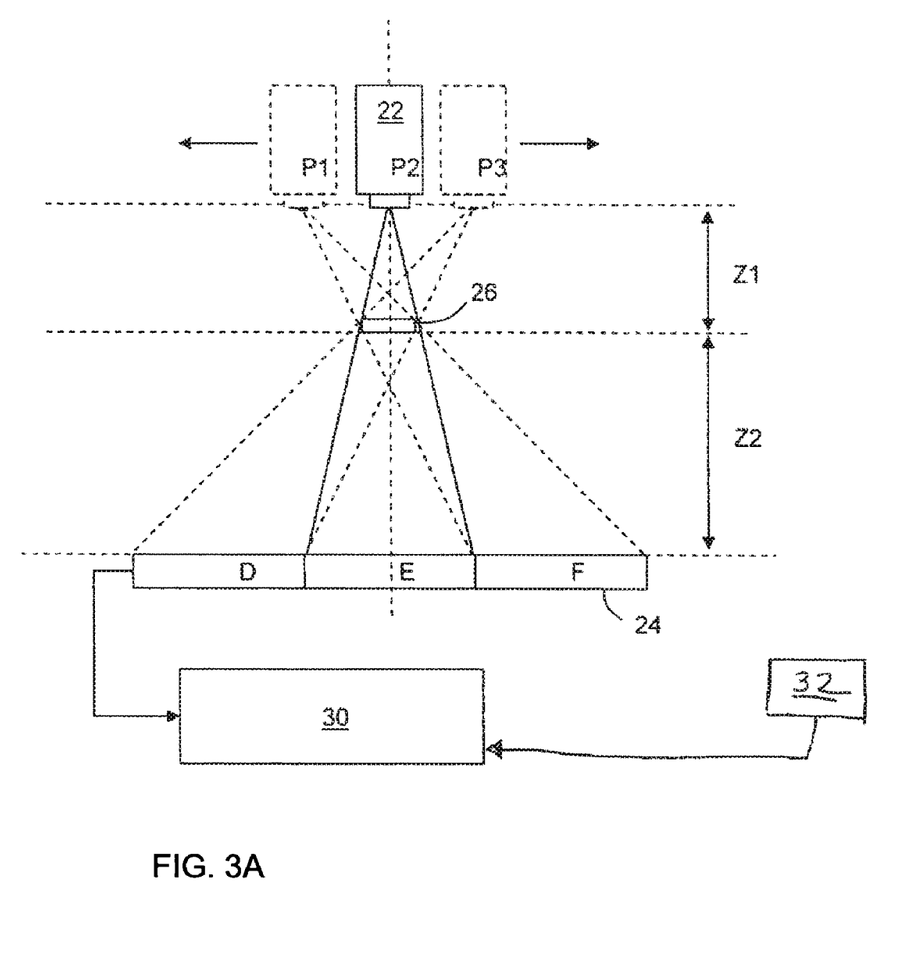
FIG. 3A shows a calibration system according to one embodiment.

With reference to FIG. 3A, according to one embodiment, the source 22 can be moved to different positions (see, e.g., positions P1, P2, P3) with respect to object 26 to provide different views of the object 26. Here, the position of the object 26 is kept generally fixed, and the distance Z1 is kept constant as the source 22 is moved. Although FIG. 3A shows that the source 22 is moved generally along a first dimension (i.e., towards the left or the right in FIG. 3A), those skilled in the art will appreciate that the source 22 may also be moved generally along a dimension perpendicular to the first dimension (i.e., a direction pointing out from or into the figure) to provide different views of the object 26.

Figure 3B:
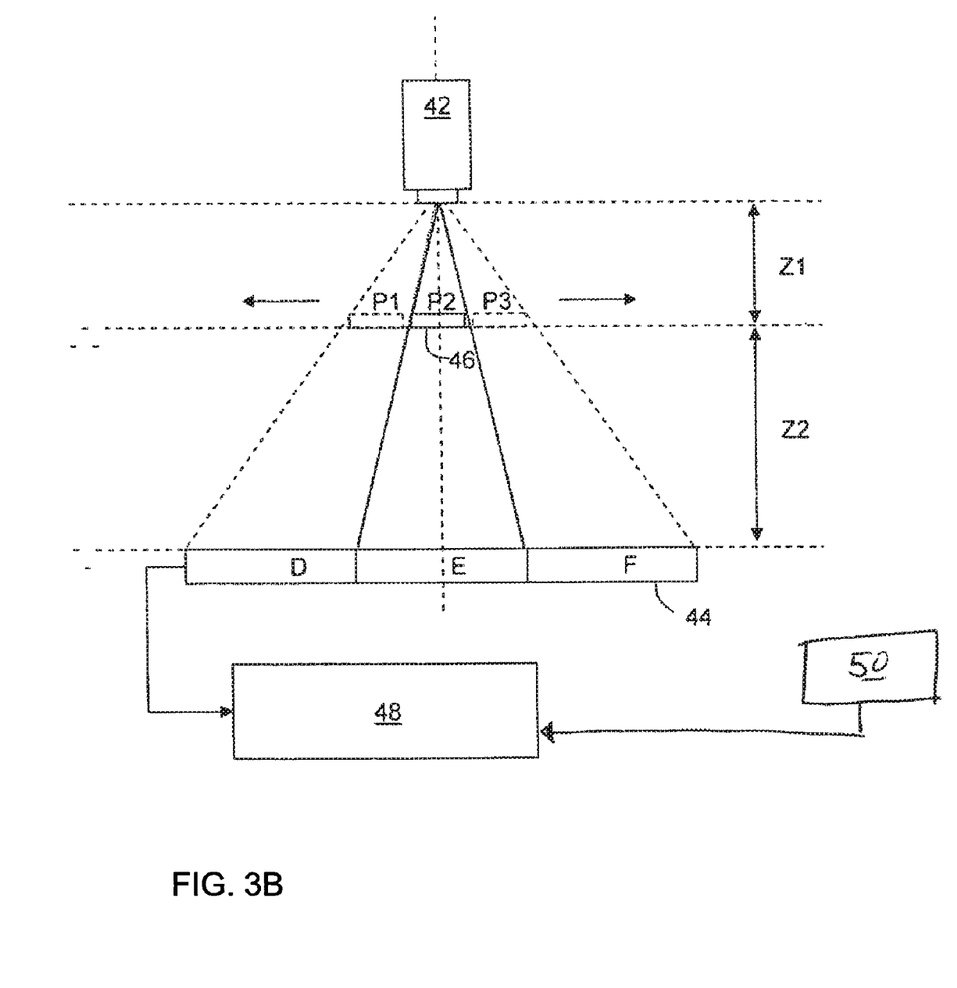
FIG. 3B shows a calibration system according to another embodiment.

With reference to FIG. 3B, according to another embodiment, the source 42 remains stationary, while the object 46 is moved generally along the dimensions described in the above paragraph (see, e.g., positions P1', P2', P3'). Similar to the embodiment of FIG. 3A, the detector 44 is positioned opposite the source 42.

In certain embodiments, the detector 24, 44 is a solid-state device that receives the penetrating X-ray energy (including X-ray energy attenuated by the object) and accordingly produces image data (such as, but not limited to, grayscale image values). For example, each pixel of the detector 24, 44 produces a grayscale value according to the energy that it detects. The grayscale values may serve as an indicator of X-ray absorption by the object. For example, a darker value may correspond to a lower amount of detected energy, which may indicate that a corresponding portion of the object is thicker and/or more absorbent. Conversely, a lighter value may correspond to a higher amount of detected energy, which may indicate that a corresponding portion of the object is less thick and/or less absorbent. In certain embodiments, the output values are sent to an image processor and/or viewer for processing and/or viewing (see, for example, processor/viewer 30 in FIG. 3A and processor/viewer 48 in FIG. 3B).

In certain embodiments, a beam monitoring device (see, for example, the monitoring device 32, 50 of FIGS. 3A, 3B) may be used in addition to, or in place of, the detector. In a particular embodiment, the beam monitoring device is a photodiode. Similar to the detector 24, 44, the beam monitoring device is for detecting X-ray energy. In certain embodiments, the beam monitoring device is coupled with the processor/viewer 30, 48. As such, it is understood that measurements provided by the detector 24, 44, as described above, may also be provided by the beam monitoring device.

Figure 4:
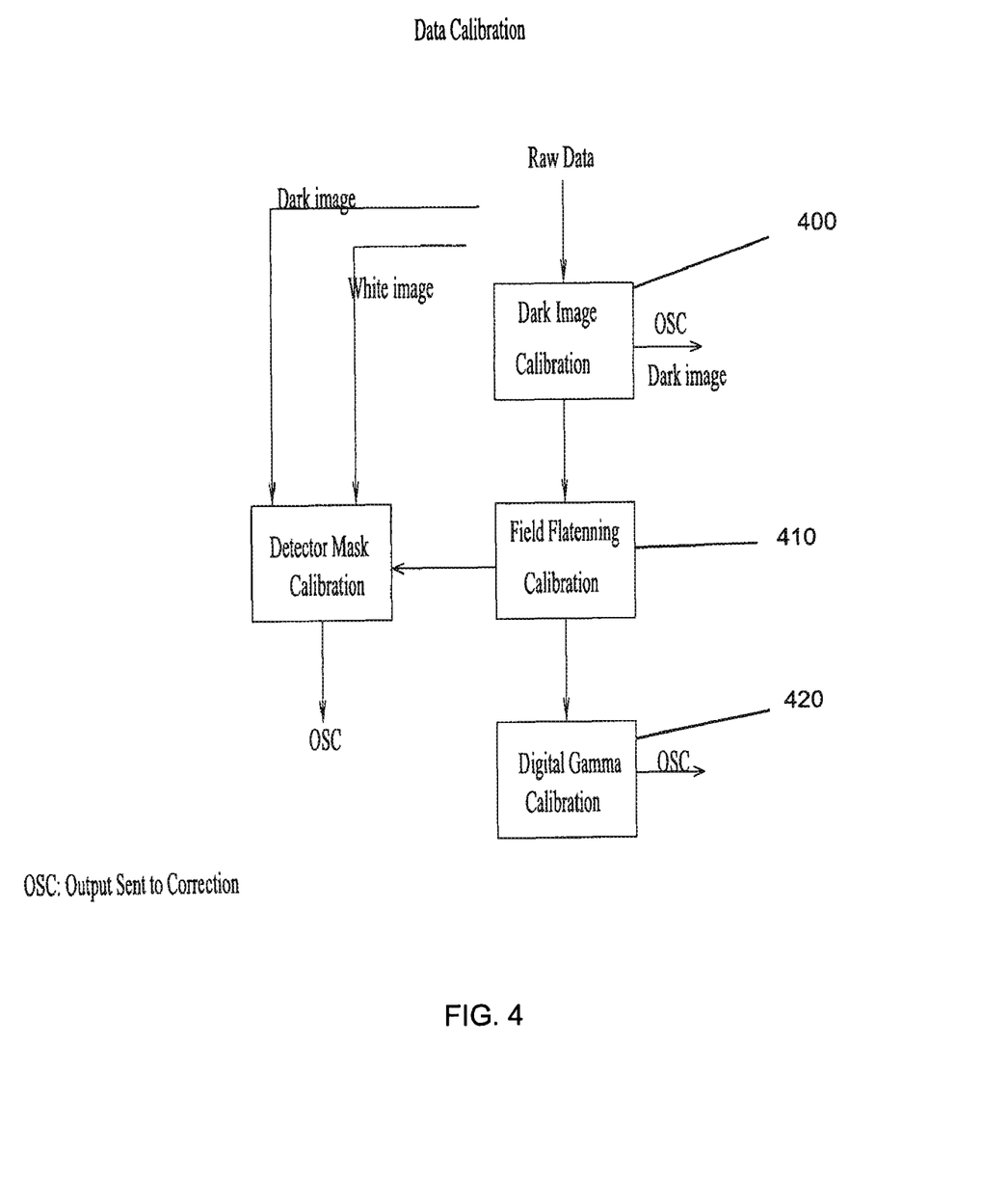
FIG. 4 shows a calibration flowchart according to a known system.

With reference to FIG. 4, a flow diagram of a known calibration system is shown. The calibration system is for calibrating systems including, but not limited to, X-ray inspection systems such as those described above.

Classical digital radiography techniques rely on X-ray flux to distinguish high contrast features. Tomosynthesis techniques rely on X-ray flux measurements taken from different angles (or views) to form an image using a density map of an object. Here, at each angle, the performance of the measurement is essentially identical (or similar) to taking a conventional X-ray image. Both types of techniques, however, require a line integral of the resulting two-dimensional raw images, referred to herein as projections. Assuming that input X-ray photons are mono-energetic, an equation that relates the output X-ray energy (e.g., the energy that has not been absorbed by an object and is detected by the detector 24, 44) to that of the input X-ray energy (e.g., the energy that is produced by the source 22, 42 and incident on the object) is $$I = I_0 e^{-\mu \Delta x}. \tag{1}$$

In equation (1), I is the output X-ray energy, $I_0$ is the input X-ray energy, $\Delta x$ is the thickness of the inspected object (or a corresponding portion thereof), and $\mu$ is the linear attenuation coefficient (or absorption coefficient) of the object material. The above equation, also known as the Beer-Lambert law, expresses output energy as a function of input energy and the object material. Based on equation (1), it can be appreciated that materials having higher $\mu$ values produce higher levels of X-ray attenuation relative to materials having lower $\mu$ values. The higher levels of X-ray attenuation result in lower output energy (assuming that input energy levels are equal in both cases). In the case of air, the value of $\mu$ is approximately zero. Therefore, when the "object" positioned between an X-ray source and a detector is merely air, the output energy I is theoretically equal to the input energy $I_0$ because $e^0 = 1$.

Where a non-uniform object is under examination (i.e., the object is made of multiple materials having different attenuation coefficients), the overall attenuation characteristics can be modeled as follows. If the object is considered as being composed of multiple (e.g., N) objects, each having a uniform thickness of $\Delta x$, the exit X-ray flux from one object may be treated as the entrance X-ray flux to an adjacent object. Mathematically, this model can be expressed as $$I = I_0 e^{-\mu_1 \Delta x} e^{-\mu_2 \Delta x} e^{-\mu_2 \Delta x} \ldots e^{-\mu_n \Delta x} = I_0 e^{-\sum_{n=1}^{N} \mu_n \Delta x}. \tag{2}$$

Dividing both sides of equation (2) by $I_0$ and taking the negative natural logarithm of both sides of the resulting equation produces:

$$\hat{p} = -\ln\left(\frac{I}{I_0}\right) = -\sum_{n=1}^{N} \mu_n \Delta x. \tag{3}$$

In equation (3), $\hat{p}$ is a mathematical representation of the two-dimensional image, or projection. As $\Delta x$ approaches zero, $\hat{p}$ approaches the integral of an attenuation coefficient function over the length (or thickness) L of the object:

$$\hat{p} = -\ln\left(\frac{I}{I_0}\right) = -\int_L \mu_n(x) dx. \tag{4}$$

As such, equation (4) expresses the natural logarithm of the ratio of the output X-ray energy (or intensity) to the input X-ray energy as a line integral of the attenuation coefficients along the X-ray path.

Assuming that an X-ray beam is mono-energetic, an intensity $C'(i,j)$, as detected by a pixel of the detector 24, 44, can be expressed as:

$$C'(i, j) = S(i, j)P_0(i, j) - \int_{p \in path} \mu(x, y, z) dp. \quad (5)$$

In equation (5), i and j respectively refer to the row and column coordinate of the pixel in the detector, $C'(i,j)$ represents (or is proportional to) the counts (e.g., grayscale value) produced by the pixel located at coordinates $(i,j)$, $\mu(x,y,z)$ is the X-ray attenuation coefficient of the object sample at each point between the X-ray source and the X-ray detector, and the integral is over the path p, which represents the trajectory of the X-ray beam from the X-ray source to the detector pixel. $P_0(i,j)$ is the energy incident on the object sample, which is proportional to the drive current applied to the X-ray source. $S(i,j)$ is the sensitivity of each detector pixel. It is assumed that $P_0(i,j)$ takes into account the anode heel effect and other propagation distance variations of the system, and that the attenuation coefficients $\mu(x,y,z)$ may span a wide range of materials, ranging from more dense materials including, but not limited to, copper, aluminum and lead to less dense materials including, but not limited to, air. However, this model does not consider the X-ray spot size, scatter, the detector point spread function (PSF) and/or polyenergetic X-ray photons. In tomosynthesis digital imaging, several projections are taken of an object, with the X-ray source placed at different positions (see, for example, FIGS. 1 and 3A). These images may be denoted by $C'_n(i,j)$, where positions of the source are denoted as $X_n$, where n=1, 2, ..., N.

Variations in pixel sensitivity may be corrected by a calibration process, which can be mathematically expressed as $$C_n(i, j) = G(i, j) C'_n(i, j) \quad (6)$$

where $G(i,j)$ is a gain calibration map or table and $$G(i, j) = \frac{1}{S(i, j)P_0(i, j)}. \quad (7)$$

The calibration procedure may generally correct for defective (or otherwise imperfect) pixels in the detector panel as well as for situations in which $S(i,j)=0$ and correct for detector bias with a calibration dark image subtraction, as will be described in more detail below (see, for example, step 400 of FIG. 4). A parameter defined by $$I_{log}(i, j) = -\ln \frac{G(i, j)}{C'_n(i, j)} \quad (8)$$

is expressed as a logarithm such that signal components are additive and linear processing methods can be utilized. The analysis here is performed in the log domain to facilitate linear processing of signals derived from the projections as defined by $\hat{p}$ in Equation (4).

As previously noted, two-dimensional raw images produced by X-ray systems such as those described herein are referred to in this disclosure as projections. Projections may be calibrated (or corrected), for example, to remove artifacts including, but not limited to, undesirable artifacts of the X-ray imaging process. For example, the projections can be field flattened and the image data linearized with respect to thickness of object measured. Field flattening is performed to ensure that there is a more uniform representation of data at the edges (or edge portions) of the image relative to the center (or center portions) of the image. As such, field flattening improves homogeneity of the image. However, such features may not be easily or readily achievable or attainable due to characteristics of the X-ray beam, the $1/r^2$ effect (which is described in more detail, for example, in Doi, Suzuki and Hara, "Real-time X-ray Inspection of 3-D Defects in Circuit Board Patterns," IEEE Proceedings of the Fifth International Conference on Computer Vision, 1995, pages 575-582, the content of which is incorporated by reference in its entirety), the actual focal spot size, the anode heel effect, and the various propagation distances.

A known process for performing field flattening of an image is described in more detail below. This process is described with reference to FIG. 4 (see, for example, step 410 of FIG. 4).

If $I(i,j)$ represents the 2-dimensional raw projection image (i.e., with i,j referring to a particular pixel of the detector and $I(i,j)$ referring to the grayscale value produced by that pixel), then field flattening yields a corrected image $I_{corrected}$ that can be expressed as $$I_{corrected}(i, j) = (I(i, j) - I_{dark}(i, j)) \times B(i, j) + \text{Offset}(i, j). \quad (9)$$

The subtraction of $I_{dark}(i,j)$ is performed to correct or adjust for dark current that may exist in the particular X-ray sensor (or detector) used. The dark intensity is derived from one or more dark images, which are taken, for example, at a drive voltage of around 0 kilovolts and a drive current of around 0 milliamps. As such, dark images are images taken in the absence of X-ray energy.

After the dark image correction is performed, then a digital gamma correction may be performed (see, for example, step 420 in FIG. 4). With continued reference to equation (9), $B(i,j)$ refers to a gain value computed by shooting X-rays at a known energy (e.g., at a known drive voltage and drive current) through multiple plates of a known material (e.g., stainless steel) one plate at a time. The plates have different thicknesses with respect to one another. For example, three different plates can be used (e.g., a plate of a lower thickness, one of a medium thickness, and one of a higher thickness). For example, respective thicknesses of the plates can be 15 mils, 30 mils, and 90 mils. Once measurements have been taken of the different plates using the X-rays of a known energy, the results can be used to derive a linear curve fit. The linear curve fit is derived to approximate the non-linear response of X-ray intensity with respect to the thickness of the sample measured. That is, the relationship between the intensity values and the thickness of the inspected object can be approximated by a linear equation of the form $y = mx + c$ (see, for example, equation (9) above). In such an equation, m is the slope of the curve and c is the y-offset.

The $I_{corrected}(i,j)$ projection image can be further processed using standard image processing techniques. One such technique is known as gamma processing. Here, the corrected projection image is input into a gamma function. The result is an image having a more uniform variation of intensity within a given grayscale range. Mathematically, such processing can be represented by the equation:

$$I_{\gamma corrected}(i, j) = \gamma_{index}(I_{corrected}(i, j)). \quad (10)$$

Further corrections can also be made. For example, if one or more pixels of a digitizing X-ray sensor are known in advance to be defective (or otherwise imperfect) (in some situations, a map may be provided identifying such pixels), these pixels can be corrected for. For example, an image value can be ascribed to a defective pixel, where the ascribed value is based on a weighted interpolation of neighboring pixels. Such correction may be useful in that values in the projection data, that are produced by defective pixels, can be removed and replaced. The resulting corrected image is referred to herein as $I_{final}(i,j)$.

$$I_{final}(i,j)=\text{Detector correction}(I_{\gamma corrected}(i,j)) \quad (11)$$

However, field flattening using digital gamma techniques, such as those described above, may not be effective or sufficiently effective. For example, as previously described, these techniques involve sequentially measuring different inspection samples, such as plates of metal having thicknesses that are different from one another. This may require driving the X-ray source at different current levels to better facilitate measuring of the different plates. For example, measuring a thicker sample may require that a higher current be applied to the X-ray source so that more meaningful results can be obtained (for example, X-ray energy produced using a current of an insufficient magnitude might be fully absorbed by such a sample). These techniques may also be problematic because the system response is not linear with thickness. For example, although a thicker portion of a sample may produce a higher level of absorption of X-ray energy, the level of absorption may be nonlinear with respect to the thickness of the sample.

In addition, curve fitting using the gamma technique may not be intuitive and is empirically determined to a larger extent than it is mathematically determined. Further, calibrating using the digital gamma technique may require that the calibration process be repeated at a higher frequency—e.g., once a day after warm up, at each manufacturing shift change, etc. In addition, because the digital gamma technique does not correct for flux variations, it may be necessary to tune the technique in accordance with a specific system.

Figure 5:
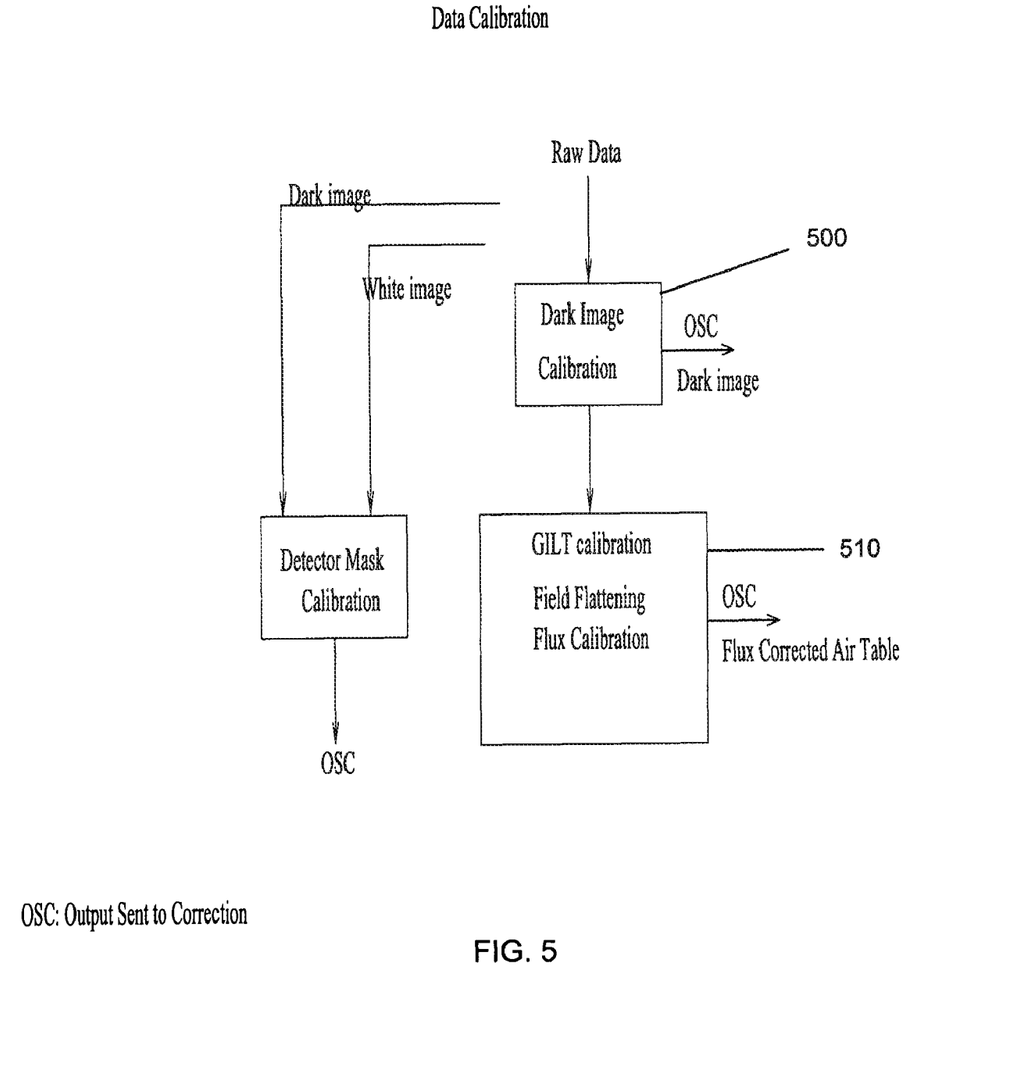
FIG. 5 shows a calibration flowchart of a generalized inverse log transform (GILT) process according to one embodiment.

In embodiments of the present invention, an "air calibration" is performed, as will be described in more detail below (see, for example, step 510 in the generalized inverse log transform (GILT) process of FIG. 5). In some embodiments, the air calibration is performed at a processor such as processor 30, 48 of FIGS. 3A, 3B. The air calibration may be used in place of the known digital gamma technique. The air calibration technique performs field flattening of images more effectively—e.g., in eliminating (or at least partially reducing) the $1/r^2$ effect previously described. As noted previously, field flattening is performed to render more uniform representation of data at edges of the image as well as at the center of the image.

As also noted previously, improving the homogeneity of images may not be easily achievable due to factors including the characteristics of the X-ray beam, the curved nature of the flat panel detectors, the actual focal spot size, the anode heel effect and the various propagation distances. As will be described in more detail below, an "air table" is produced (e.g., based on images produced according to the system configuration of FIG. 1) to eliminate or at least reduce the impacts of the $1/r^2$ effect. According to embodiments of the present invention, values of the air table capture systematic errors which are present in images produced by the system. These images include "air images," as well as images of an object under inspection. Subtracting values of the air table from the inspection images effectively eliminates or at least reduces the effects of systematic errors in the system. Flux correction on the other hand is handled separately and is described in more detail below.

Calibrating inspection images using the values of the air table, as will be described in more detail below, may correct for instability in the source (or tube) output, which may occur during an inspection. In addition, such calibration may correct for source instabilities that arise during the operating lifetime of the source. These adjustments are based on the premise that systematic errors resulting from behavior such as, but not limited to, fluctuations of the tube, voltage, current or other system instabilities can be captured in the air table values and can be effectively removed via processing (e.g., performing mathematical operations).

According to one embodiment, the calibration technique involves building an air table consisting of air reference values. In a further embodiment, each of the reference values corresponds to an individual pixel of the detector panel. As such, in a panel having 2496×2304 pixels, the air table may include 2496×2304, or 5,750,784 values.

According to one embodiment, the calibration of a system (e.g., the system shown in any of FIGS. 1, 2, 3A, 3B) includes taking an air image using the system. An air image is an image taken with no object (e.g., no material other than air) positioned in the path of the X-ray beam(s), from the source to the detector—hence, the term "air image." The air image effectively captures effects of systematic errors on the images produced by the system. Processing images taken by the system (e.g., of one more actual objects positioned between the source and the detector) based on the air images—e.g., by subtracting air image grayscale values from those of the images—eliminates (or at least partially reduces) the effects of the systematic errors. In one embodiment, the air image grayscale values are collected in a table for processing of the images.

Because no object is placed between the source and the detector in producing the air images, the air images may be produced using a generally constant drive current and/or drive voltage. This may be contrasted with the digital gamma techniques described previously, which involved driving a X-ray source at different levels to better facilitate the imaging of sample plates having thicknesses different relative to one another.

In one embodiment, the calibration images are air images that are taken at one set of settings generally the same as the set of settings that are used subsequently to take acquisition images—i.e., images of actual objects. However, in other embodiments, the calibration images are taken at a set of settings different from the set of settings used to take the acquisition images.

For example, according to one embodiment, one such setting is the drive current that is applied to the X-ray source. In order to provide a higher-quality image when an actual object is being imaged, the acquisition images are taken at a drive current higher than that used in taking the calibration images. In addition, it may be desirable to take the calibration images using a lower drive current in order to avoid potentially oversaturating the detector.

According to another embodiment, a setting that is varied in taking the calibration images and the acquisition images is the frame integration setting, i.e., the number of frames (or actual snapshots) that compose a single image. The frame integration setting may also be specified in terms of milliseconds (i.e., the spacing in time in between consecutive frames). Here, it is understood that taking multiple frames and processing the frames (e.g., by averaging them out) to produce a single image may serve to produce images that are less noisy. For example, according to one embodiment, in order to provide a higher-quality (e.g., less noisy) image when an actual object is being imaged, the acquisition images are taken at a frame integration setting higher (i.e., more frames are used to compose a single image) than that used in taking the calibration images. Here, it is contemplated that taking multiple frames and processing the frames (e.g., by averaging them out) to produce a single image may serve to produce images that are less noisy.

In embodiments such as those described above where settings (such as drive current and/or frame integration) are changed in between taking the calibration images and the acquisition images, the values of the air table are modified according to the changes in the settings. In a further embodiment, the values of the air table are created by multiplying the grayscale values of the air images by (1) a ratio of the drive current used to take the acquisition images to the drive current used to take the air images and (2) a ratio of the frame integration used to take the acquisition images to the frame integration used to take the air images.

In still another embodiment, where settings (such as drive current and/or frame integration) are changed in between taking the calibration images and the acquisition images, the air table values are calculated differently. Here, the air images include two images: one image taken at the first set of settings and another image taken at the second set of settings. In a further embodiment, the values of the air table are created by dividing the grayscale values corresponding to the images of the first set of settings by the grayscale values corresponding to the images of the second set of settings.

Figure 2:
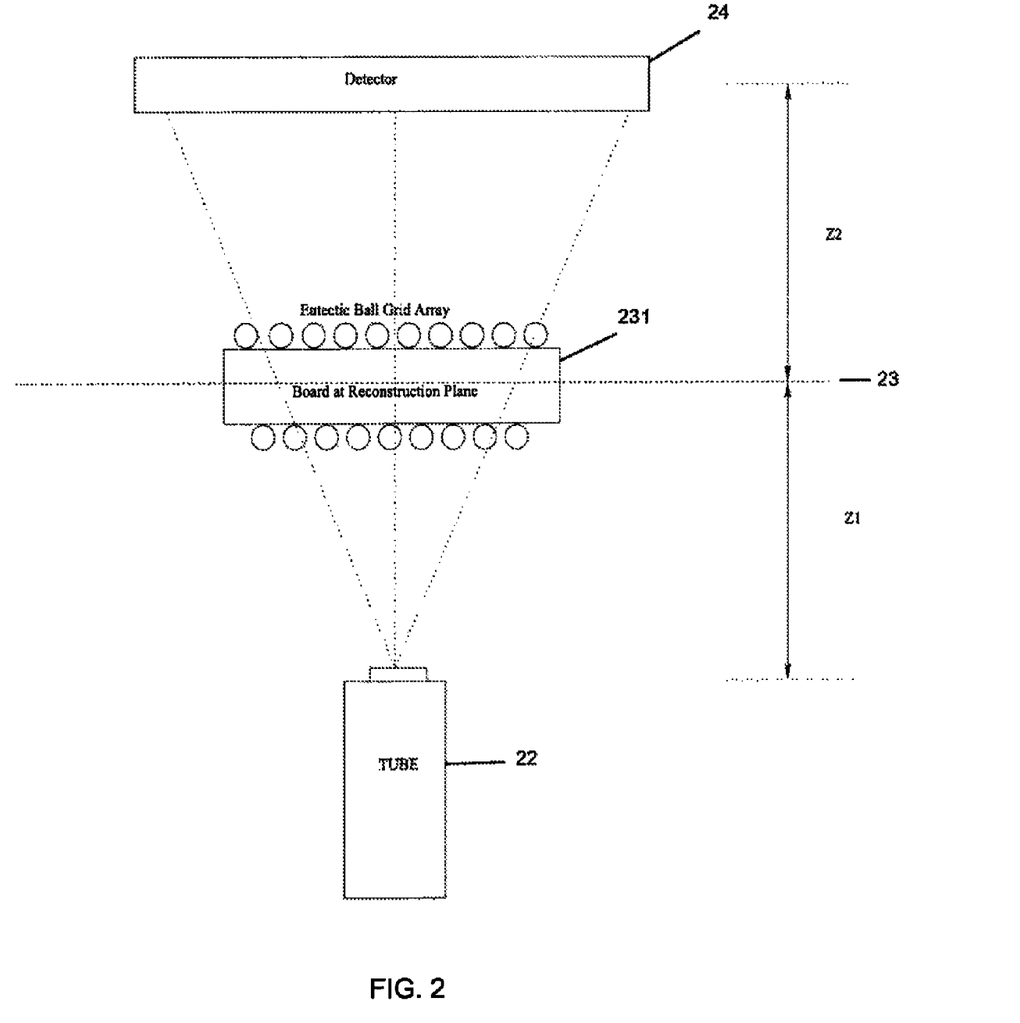
FIG. 2 shows an inspection system according to another embodiment.

Although settings such as the drive current and the frame integration may be configured differently, as described above, the Z1 and Z2 distances (see, for example, FIGS. 1 and 2A) are kept generally constant while taking both the inspection images and the air images.

In an exemplary embodiment, calibration of a system is performed as follows:

The air calibration can be mathematically modeled as:

$$I'_0 = \ln(I_0), \quad (12)$$

where $I_0$ is the air image (i.e., the collection of grayscale values that compose the image) obtained by shooting X-ray energy through air (see, e.g., the system configuration as shown in FIG. 1).

The air image $I_0$ is taken at a drive current level $mA_{air}$ (in units of microamps) and at a frame integration value of $FI_{air}$ (in units of number of frames). A flux parameter $I_{mo}$ during an air shot can be determined as the product of the drive current level and the frame integration value. That is, $$I_{mo} = mA_{air} \times FI_{air}. \quad (13)$$

As previously described, the air images may be taken at a set of settings different from the set of settings used to take acquisition images (referred to below as I). For example, acquisition images may be taken at a drive current level $mA_{insp}$ and at a frame integration value of $FI_{insp}$, one or more of which may be respectively different from (e.g., greater than) $mA_{air}$ and $FI_{air}$. As such, a flux parameter value $I_m$ can be determined as the product of the drive current level and the frame integration value. That is, $$I_m = mA_{insp} \times FI_{insp}. \quad (14)$$

According to a further embodiment, the parameter $I_{flux}$ is determined to account for potential differences in one or more of the settings described above:

$$I_{flux} = \frac{mA_{insp} \times FI_{insp}}{mA_{air} \times FI_{air}} = \frac{I_m}{I_{mo}}. \quad (15)$$

As such, values of the air table can be calculated as:

$$I'_{0\,flux} = I'_0 \times I_{flux} = \ln(I_0) - \ln(I_{mo}) + \ln(I_m). \quad (16)$$

It is understood that the calculation of equation (16) accounts for potential differences in the settings used to take the air images and the acquisition images. Here, it is noted that if the settings used are not changed (e.g., $I_m$ is generally equal to $I_{mo}$), then the values of the air table are equal to the grayscales of the air image $I_0$.

As previously noted, an air image may be modeled as the natural logarithm of the grayscale values that make up the air image. Similarly, an acquisition image may be modeled as the natural logarithm of the grayscale values that make up the acquisition image. That is, $$I' = \ln(I), \quad (17)$$

where I is the image obtained upon positioning an object between the source and the detector (see, for example, the configuration shown in FIG. 2).

According to one embodiment, the acquisition image is calibrated using the values of the air table. In one exemplary embodiment, the values of the air table are subtracted from the grayscale values of the acquisition image. That is, $$I_{calibrated} = I'_0 - I' = \ln(I_0) - \ln(I_{mo}) + \ln(I_m) - \ln(I). \quad (18)$$

Here, the reverse of the sign in equation (18) is due to the inverse absorption equation from equation 1.

As previously described, with reference to another embodiment, where settings (such as drive current and/or frame integration) are changed in between taking the calibration images and the acquisition images, air table values may be calculated differently. Here, the air images include two images: one image taken at the first set of settings and another image taken at the second set of settings. The calculation will be described in more detail below.

As described, embodiments of the present invention are directed to a software-based technique that is more cost effective. However, embodiments of the present invention are not limited thereto. For example, in other embodiments, a hardware modification may be implemented in the system by placing a hardware element, such as (but not limited to) a reference monitor or a photodiode, in the system (see, for example, the monitoring device 32, 50 of FIGS. 3A, 3B). The hardware component is for constantly (or periodically) monitoring the tube output over a period of time, both during calibration as well as during an inspection. Placement of such a hardware monitor may also be effective in eliminating "systematic errors." As such, embodiments of the present invention also contemplate positioning hardware monitors in the system (e.g., adjacent to the X-ray source).

According to one embodiment, the building of the air table is based on a mathematical model of X-ray radiation as opposed to an empirically determined solution. The air table is used to perform the field flattening. According to an exemplary embodiment, the air tables are built when there is a change in the inspection geometry such as, but not limited to, changes to the Z1 and Z2 distances. This approach may be contrasted with the known approach, where a digital gamma table is required to be built for every single exposure setting.

According to described embodiments, the technique eliminates system instability caused by using different exposure settings, which was required in the known technique. This is because certain elements (or artifacts) can be removed from the processed image.

Accordingly, the useful life of the X-ray source can potentially be lengthened. In more detail, using known techniques, the tube may be replaced earlier than necessary because data produced by the system are not compensated to account for fluctuations of the source over its lifetime. That is, there is no reference correction. The fluctuation in the tube over its lifetime may lead to differences in produced grayscale values. This, in turn, may lead to differences in inspection results, which may then lead to a higher false calls rate. A user may correlate the higher false call rates to depreciation of tube life, which, in actuality, may not be fully accurate.

Embodiments of the current invention use a reference correction to compensate for the tube output fluctuations, thereby potentially prolonging the useful life of the tube. In addition, the use of multiple reference plates, as described with reference to known techniques, is eliminated.

One feature of embodiments of the present invention is better image quality over other systems in the field. Another feature is that tube life can be extended due to software compensation, thereby reducing replacement unit costs. Another feature is reduced variability across results from machine to machine, e.g., from 25% to less than 3%.

Because system-to-system stability can been achieved using embodiments of the present invention, these embodiments may be useful in applications where Gauge Rand R requirements for machine-to-machine variability have extremely tight tolerances. Another feature is improved temporal stability.

Known techniques (such as those using multiple calibration sheets) involve building a table for every geometry change (e.g., Z1 & Z2). These known techniques are limited in the number of fields of view possible, given the calibration data.

According to embodiments of the present invention, an approach is continuous in that a field of view can be chosen and an air table prepared accordingly. For example, according to one embodiment, one field of view (FOV) may be chosen, and air images may be taken at one drive level, producing one air table. According to another embodiment, one FOV is selected, and air images are taken at five different drive current levels, thereby producing 5 tables. This may be repeated for a number of different fields of view, to prepare more tables. For example, assuming four FOVs, 20 tables may be prepared.

As previously described, known imaging techniques are based on the assumption that a difference in grayscale level reflects a difference in thickness level of object under inspection. This is incorrect insofar as the relationship between the thickness of the object inspected and the grayscale level is non-linear. As such, in embodiments of the present invention, the relationship between grayscale and thickness of the inspected object may be linearized according to the disclosure of co-pending U.S. application co-pending U.S. patent application Ser. No. 12/193,235 filed on the same date herewith entitled "Method of and System for Obtaining Linear Data for Object Scanned Using Non-Collimated, Polyenergetic X-ray Beams", the contents of which are incorporated herein by reference.

According to an exemplary embodiment of the present invention, a process for calibrating images includes the following:

1. An air image $I_{air}^{raw}(i, j)$ is taken. An air image may be defined as a 2-D transmission image acquired at distances Z1 and Z2 separating a reconstruction plane from the source and from the detector, respectively. In a particular embodiment, the air image is taken at a voltage of 110 kV and a current of 0.070 mA applied to the source. As previously described, the X-ray energy generated from the source travels to the detector with no object in the beam path (see, for example, the configuration of FIG. 1). Multiple images (e.g., N images) may be taken.

2. Acquire one or more dark images $I_{dark}(i, j)$. A dark image may be defined as an image taken without using X-ray energy (e.g., at a drive voltage of around 0 kilovolts and a drive current of around 0 milliamps applied to the X-ray source). Here, according to one embodiment, the number of dark images taken is equal to the number of air images acquired (N).

3. In a further embodiment, the images above are cropped and/or flipped (or rotated). For example, an image may be cropped from an original size of 2396×2404 pixels to a cropped size of 2192×2192 pixels. Here, the portion of the image produced by certain pixels is cropped to remove certain portions of the image such as (but not limited to) peripheral portions of the image for ease of later processing, reductions in computational load, etc. In one embodiment, the image is also flipped (or rotated) about a certain axis (e.g., vertical or horizontal). Here, the image is manipulated for providing a certain or desired orientation that may not have been provided by the imaging configuration.

4. The dark images are then subtracted from the air images as follows:

$$I_{air}(i, j) = \sum_{n=1}^{N} I_{air}^{raw}(i, j)_n - I_{dark}(i, j)_n. \quad (19)$$

5. According to one embodiment, a reference factor $I_{ref}$ is computed. The reference air value is computed, for example, to account for potential difference(s) in settings used in taking the air images and later inspection images.

(a). Here, according to a particular embodiment, $I_{ref}$ is computed as a ratio of (1) settings used to take subsequent inspection images to (2) settings used to take the above air images. For example, if inspection images are taken at a drive current level of $mA_{insp}$ and a frame integration value of $FI_{insp}$ and if air images are taken at a drive current level of $mA_{air}$ and a frame integration value of $FI_{air}$, then $I_{ref}$ may be computed as:

$$I_{ref} = \frac{mA_{insp} \times FI_{insp}}{mA_{air} \times FI_{air}}. \quad (20)$$

(b) According to another embodiment, $I_{ref}$ is computed using air images taken at one set of settings and a second set of settings that is used to take subsequent inspection images. For example, if inspection images are taken at a drive current level of $mA_{insp}$ and a frame integration value of $FI_{insp}$ and if air images are taken at a drive current level of $mA_{air}$ and a frame integration value of $FI_{air}$, then $I_{ref}$ may be computed as a ratio of (1) air images taken at the ($mA_{insp}$, $FI_{insp}$) settings to (2) air images taken at the ($mA_{air}$, $FI_{air}$) settings. For example, according to one embodiment, $I_{ref}$ may be computed as:

$$I_{ref} = \frac{f(images_{insp\_settings})}{f(images_{air\_settings})}. \tag{21}$$

According to one embodiment, the numerator of the ratio in equation (21) is produced by calculating a representative grayscale value corresponding to a certain number of pixels in the air images taken at the inspection settings. Similarly, the denominator of the ratio in equation (21) is produced by calculating a representative grayscale value corresponding to a certain number of pixels in the air images taken at the air settings. According to a particular embodiment, the representative grayscale value is an average grayscale value corresponding to a subset of the pixels. For example, the subset may include approximately 100,000 pixels, which may generally correspond to a central region of the images produced.

7. Reference air image values are then computed by multiplying the above reference factor by the air image values:

$$I_{air}{}^{ref}(i,j) = I_{ref} \times I_{air}(i,j). \tag{22}$$

8. The air table values are then computed by taking the natural logarithm of the reference air image values (see equation (24) below). According to a further embodiment, before the natural logarithm of the values is performed, values less than or equal to 1 are set to a default value of 1 (see equation (23) below) to compensate for underflow situations (e.g., insufficiently high readings).

$$I_{air}^{ref}(i,j) = \begin{cases} 1, & I_{air}^{ref}(i,j) \le 1 \\ I_{air}^{ref}(i,j), & \text{otherwise} \end{cases} \tag{23}$$

$$I_{air}^{tablelog}(i,j) = \ln I_{air}^{ref}(i,j) \tag{24}$$

As described above, the calculation of reference air image values is described with reference to exemplary embodiments. The calibration of inspection images according to reference air image values is described in more detail below, with reference to an exemplary embodiment.

1. An inspection image $I_{raw}(i,j)$ is acquired. Here, an inspection image can be defined as a 2-D transmission image acquired at an imaging plane located at distances Z1 and Z2 separating a reconstruction plane from the source and from the detector, respectively. A certain voltage and current (e.g., 110 kV, 0.070 mA) is applied to the source to generate X-ray energy. An object under inspection is placed in the path of the beams along the reconstruction plane. Multiple images (e.g., N) may be acquired.

2. Multiple N dark images $I_{dark}(i,j)$ are acquired. As previously described, a dark image is taken in the absence of X-ray energy.

3. In one embodiment, the above images are cropped and/or flipped. For example, as described previously, the images may be reduced from an original size of 2396×2404 pixels to a cropped size of 2192×2192 pixels. As another example, the image may also be flipped (or rotated) about a certain axis (e.g., the x-axis).

4. The dark images are then subtracted from the inspection images as follows:

$$I_{raw}(i,j) = \sum_{n=1}^{N} I_{raw}(i,j)_n - I_{dark}(i,j) \tag{25}$$

5. The images are further processed by taking the natural logarithm of the inspection images (see equation (27) below). According to a further embodiment, before the natural logarithm of the images is performed, values less than or equal to 1 are set to a default value of 1 (see equation (26) below) to compensate for underflow (e.g., insufficiently high) readings.

$$I_{raw}(i,j) = \begin{cases} 1, & I_{raw}(i,j) \le 1 \\ I_{raw}(i,j), & \text{otherwise} \end{cases} \tag{26}$$

$$I_{raw}^{log}(i,j) = \ln I_{raw}(i,j) \tag{27}$$

6. The images are then calibrated according to the air table values described above. For example, according to one embodiment, the natural logarithm of the images is subtracted from the air table values to produce the calibrated image values.

$$I_{aircor}{}^{log}(i,j) = I_{air}{}^{table\ log}(i,j) - I_{raw}{}^{log}(i,j) \tag{28}$$

7. According to embodiments where the X-ray energy produced by the source is non-collimated, the calibrated images are linearized such that a linear relationship between the calibrated grayscale values and thickness of the object under inspection is obtained. Such linearization is disclosed in more detail in co-pending U.S. patent application Ser. No. 12/193,235 filed on the same date herewith entitled "Method of and System for Obtaining Linear Data for Object Scanned Using Non-Collimated, Polyenergetic X-ray Beams". This co-pending application is owned by the Assignee of the present application, and the entire contents of the co-pending application are incorporated herein by reference. As described in more detail in the co-pending application, the data is linearized by using the following formulations:

$$I_{aircor}{}^{nocoll}(i,j) = (I_{air}{}^{table\ log}(i,j) - I_{raw}{}^{log}(i,j))^2 \tag{29}$$

or $$I_{aircor}{}^{nocoll}(i,j) = (I_{aircor}{}^{log}(i,j))^2 \tag{30}$$

8. Finally, according to a further embodiment, the linearized image data are scale appropriately for analysis by existing classification algorithms. Classification algorithms or detection algorithms are mathematical processes (e.g., processes that may be implemented in software) which may use the corrected X-ray image as input and analyze the input in order to find defects such as, but not limited to, opens, bridges, voids, etc. in the components on the printed circuit board. According to one such classification algorithm, equation (31) is employed:

$$I_{aircor}{}^{scale}(i,j) = I_{white} - I_{aircorr}{}^{nocoll}(i,j) \times S_c, \tag{31}$$

where $I_{white} = 4095$ $S_c$ is a scale factor that may be empirically determined.

Embodiments of the present invention are directed to a software-implemented correction approach for calibrating imaging systems in a cost- and time-efficient manner. According to certain embodiments, tube life can be extended due to software compensation, thereby reducing field replacement unit costs.

It should be understood that various modifications may be made to the embodiments disclosed herein. Therefore, the above description should not be construed as limiting, but merely as exemplification of the various embodiments. By way of example, other embodiments may be used for imaging assemblies for purposes other than inspection and quality control. Those skilled in the art will envision other modifications within the scope and spirit of the claims appended thereto.

What is claimed is:

1. A calibration system for calibrating image data produced by an imaging device, the calibration system comprising:
   a processor configured for:
   receiving the image data from the imaging device;
   receiving a plurality of reference values from the imaging device; and
   calibrating the image data using the reference values,
   wherein the reference values are derived from air image data produced by the imaging device,
   wherein the image data are produced by the imaging device according to a first drive current,
   wherein the air image data are produced by the imaging device according to a second drive current, and
   wherein the first drive current is higher in amplitude than the second drive current.

2. The calibration system of claim 1, wherein the processor is configured for calibrating the image data by subtracting the reference values from the image data.

3. The calibration system of claim 1,
   wherein the image data correspond to an image of one or more objects, and wherein the air image data are produced by the imaging device free of the one or more objects.

4. The calibration system of claim 3,
   wherein the image data and the air image data are produced by the imaging device using imaging energy detected by a detector of the imaging device,
   wherein the one or more objects are positioned adjacent the detector to produce the image data, and
   wherein the one or more objects are not positioned adjacent the detector to produce the air image data.

5. The calibration system of claim 4, wherein the imaging energy comprises X-ray energy.

6. The calibration system of claim 1,
   wherein the image data are produced by the imaging device according to a first frame integration level,
   wherein the air image data are produced by the imaging device according to a second frame integration level, and
   wherein the first frame integration level is higher than the second frame integration level.

7. A calibration system for calibrating image data produced by an imaging device, the calibration system comprising:
   means for receiving the image data from the imaging device;
   means for receiving a plurality of reference values from the imaging device; and
   means for calibrating the image data using the reference values,
   wherein the reference values are derived from air image data produced by the imaging device,
   wherein the image data are produced by the imaging device according to a first frame integration level,
   wherein the air image data are produced by the imaging device according to a second frame integration level, and
   wherein the first frame integration level is higher than the second frame integration level.

8. The calibration system of claim 7, wherein the means for calibrating is configured for calibrating the image data by subtracting the reference values from the image data.

9. The calibration system of claim 7, wherein the image data correspond to an image of one or more objects, and
   wherein the air image data are produced by the imaging device free of the one or more objects.

10. The calibration system of claim 9,
    wherein the image data and the air image data are produced by the imaging device using imaging energy detected by a detector of the imaging device,
    wherein the one or more objects are positioned adjacent the detector to produce the image data, and
    wherein the one or more objects are not positioned adjacent the detector to produce the air image data.

11. The calibration system of claim 10, wherein the imaging energy comprises X-ray energy.

12. The calibration system of claim 7,
    wherein the image data are produced by the imaging device according to a first drive current,
    wherein the air image data are produced by the imaging device according to a second drive current, and
    wherein the first drive current is higher in amplitude than the second drive current.

13. A method for calibrating x-ray image data produced by an imaging device, the method comprising:
    receiving the image data from the imaging device, the image data being acquired with a first set of exposure settings providing a first x-ray flux;
    receiving reference image data from the imaging device, the reference image data being acquired with a second set of exposure settings providing a second x-ray flux, different than the first x-ray flux;
    computing a plurality of reference values from the reference image data, the computing being based on a difference between the first x-ray flux and the second x-ray flux; and
    calibrating the image data using the reference values,
    wherein the reference image data corresponds to air image data produced by the imaging device.

14. The method of claim 13, wherein calibrating the image data comprises subtracting the reference values from the image data.

15. The method of claim 13,
    wherein the image data correspond to an image of one or more objects, and wherein the air image data are produced by the imaging device free of the one or more objects.

16. The method of claim 15,
    wherein the image data and the air image data are produced by the imaging device using imaging energy detected by a detector of the imaging device,
    wherein the one or more objects are positioned adjacent the detector to produce the image data, and
    wherein the one or more objects are not positioned adjacent the detector to produce the air image data.

17. The method of claim 13,
    wherein the first set of exposure settings comprises a setting to provide a first drive current,
    wherein the second set of exposure settings comprises a setting to provide a second drive current, and
    wherein the first drive current is higher in amplitude than the second drive current.

18. The method of claim 13, further comprising:
    measuring output of an x-ray tube to determine the first x-ray flux and the second x-ray flux.

19. The method of claim 18, wherein the x-ray tube output is monitored over a period of time, whereby compensation is provided for fluctuations in the x-ray tube output over time.

20. The method of claim 13, wherein computing the plurality of reference values comprises:

computing a scale factor as a ratio of a value representing a product of a first current setting for an x-ray tube and a first frame integration rate to a value representing a product of a second current setting for an x-ray tube and a second frame integration rate, the first current setting and the first frame integration rate being in the first set of exposure settings, and the second current setting and the second frame integration rate being in the second set of exposure settings; and scaling the air image by the computed scale factor.

* * * * *

UNITED STATES PATENT AND TRADEMARK OFFICE
CERTIFICATE OF CORRECTION

PATENT NO. : 7,819,581 B2
APPLICATION NO. : 12/193321
DATED : October 26, 2010
INVENTOR(S) : Govindarajan T. Srinivasan et al.

It is certified that error appears in the above-identified patent and that said Letters Patent is hereby corrected as shown below:

In the Drawings:

In Fig. 4, Box 410, "Flatenning" should read --Flattening--.

In the Specification:

In Column 4, line 45, equation (2), "$I = I_0 e^{-u_1 \Delta x} e^{-u_2 \Delta x} e^{-u_2 \Delta x} \ldots e^{-u_n \Delta x} = I_0 e^{-\Sigma_{n=1}^{N} u_n \Delta x}$"

should read --$I = I_0 e^{-u_1 \Delta x} e^{-u_2 \Delta x} e^{-u_3 \Delta x} \ldots e^{-u_n \Delta x} = I_0 e^{-\sum_{n=1}^{N} u_n \Delta x}$--.

In Column 14, line 1, equation (25), "$I_{raw}(i, j) = \sum_{n=1}^{N} I_{raw}(i, j)_n - I_{dark}(i, j)$"

should read --$I_{raw}(i, j) = \sum_{n=1}^{N} I_{raw}(i, j)_n - I_{dark}(i, j)_n$--.

In Column 14, line 58, "$I_{aircorr}^{nocoll}(i,j)$" should read --$I_{aircor}^{nocoll}(i,j)$--.

Signed and Sealed this

Twenty-first Day of December, 2010

David J. Kappos
*Director of the United States Patent and Trademark Office*